United States Patent [19]

Rabatin

[11] 4,070,583
[45] Jan. 24, 1978

[54] RARE EARTH OXYHALIDE PHOSPHORS COACTIVATED WITH TERBIUM, THULIUM

[75] Inventor: Jacob G. Rabatin, Chardon, Ohio

[73] Assignee: General Electric Company, Schenectady, N.Y.

[21] Appl. No.: 750,200

[22] Filed: Dec. 13, 1976

[51] Int. Cl.² .............................................. G01J 1/58
[52] U.S. Cl. ................................... 250/483; 250/460; 250/486; 252/301.4 H
[58] Field of Search ..................... 250/460, 483, 486; 252/301.4 H

[56] References Cited

U.S. PATENT DOCUMENTS 3,795,814  3/1974  Rabatin .............................. 250/460

Primary Examiner—Harold A. Dixon
Attorney, Agent, or Firm—John F. McDevitt; Lawrence R. Kempton; Frank L. Neuhauser

[57] ABSTRACT

Oxyhalides of lanthanum and/or gadolinium coactivated with thulium and terbium are phosphors found to have the advantages of reduced afterglow and increased ultraviolet emisson. The relative speed of the phosphors is also quite high. These phosphors are used in x-ray image converters generally, and can be used in such devices as x-ray image intensifier tubes, in fluoroscopic screens and in radiographic intensifier screens.

12 Claims, 1 Drawing Figure

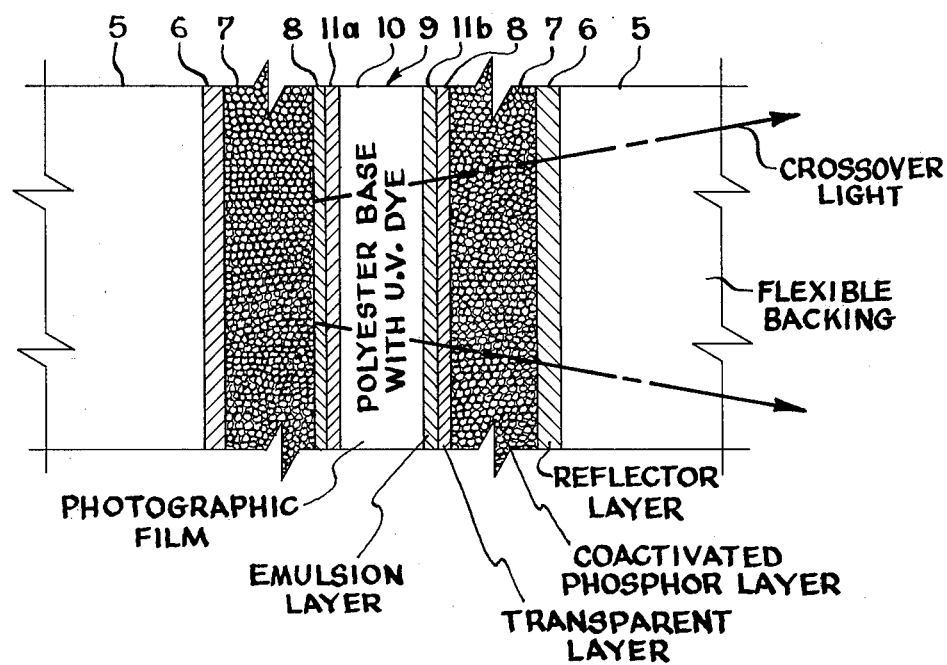

RARE EARTH OXYHALIDE PHOSPHORS COACTIVATED WITH TERBIUM, THULIUM

FIELD OF THE INVENTION

The present invention is related to rare earth oxyhalide phosphors coactivated with thulium and terbium for the conversion of x-rays to visible light, and to related x-ray image converter devices utilizing such luminescent materials.

BRIEF DESCRIPTION OF THE PRIOR ART

For x-ray image converter applications, especially when used in medical radiography, it becomes desirable to improve both speed and brightness of response for conversion of the x-rays to visible light. Calcium tungstate phosphors have been the conventional luminescent material used in such applications for a number of years. For example, this conventional fluorescent material has been employed in x-ray intensifying screens for use with photographic film. Typically, such films are placed between two intensifying screens in specially designed cassettes with said phosphor being capable of absorbing the x-rays in the region of interest for conversion to blue-near ultraviolet radiation where the photographic film is most sensitive. A faster screen is desirable to reduce the amount of x-ray exposure to the patient, and with such faster response, further minimizing the occurrence of a blurred image from physical movement by the patient. A more efficient conversion response by the phosphor which produces a visible image having higher brightness at a given level of x-ray exposure is also desirable in medical radiography since it enhances the ability to visually detect an object in the image.

U.S. Pat. No. 3,795,814 entitled "X-Ray Image Converters Utilizing Lanthanum and Gadolinium Oxyhalide Luminous Materials Activated with Thulium" discloses an improved phosphor with high sensitivity to x-rays and efficient conversion to near ultraviolet-blue emission. However, a problem in the utilization of the improved phosphor as disclosed in the patent is the occurrence of high initial afterglow or phosphorescence.

In reissued U.S. Pat. No. Re. 28,592, terbium-activated rare earth oxyhalide phosphors containing ytterbium are disclosed for reducing initial afterglow. However, in the case of these latter-mentioned phosphors, the emission characteristics in the near ultraviolet region are not as satisfactory as the phosphors mentioned which are activated with thulium.

BRIEF DESCRIPTION OF THE PRESENT INVENTION

The present invention seeks to provide rare earth oxyhalide phosphors, coactivated with a combination of rare earth activators to improve x-ray phosphor properties such as speed, afterglow and near UV emission. Since phosphors such as LaOBr 0.002Tb do not utilize all of the x-ray induced lattice energies, it has been found that various LaOBrTb, Tm phosphors improve UV emission and possibly increase speed and reduce afterglow.

The phosphors of the present invention have the general formula:

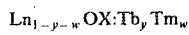

wherein $Ln$ is lanthanum and/or gadolinium, $x$ is chlorine and/or bromine,
$y$ is from about 0.0005 to 0.010 moles per mole of the selected oxyhalide; and
$w$ is from about 0.00005 to 0.005 moles per mole of the selected oxyhalide.

Well-formed crystals of the phosphor material defined above exhibit an afterglow which is significantly reduced as compared to terbium-activated lanthanum oxyhalide phosphors and simultaneously exhibit increased ultraviolet emission when compared to the terbium-activated phosphor. Utilization of the inventive phosphor lowers the cost of an image converter using a thulium-activated lanthanum oxyhalide. The present phosphor still exhibits ultraviolet emission characteristics fairly well approximating those of a thulium-activated phosphor. The relative speeds of the present invention are between those of thulium and terbium-activated rare earth lanthanum oxyhalide phosphors.

BRIEF DESCRIPTION OF THE DRAWING

The above-mentioned objects and advantages of the present invention will be more clearly understood when considered in conjunction with the accompanying drawing, in which:

The drawing is a cross section of an enlarged view of a typical x-ray image converter including an intensifying screen which incorporates the coactivated phosphor system of the present invention.

DETAILED DESCRIPTION OF THE INVENTION

The coactivated phosphor of the present invention is prepared in a standard manner utilizing the KBr flux method as disclosed in U.S. Pat. No. 3,591,516. In order to prepare LaOBr 0.002 Tm, 0.002 Tb, 5.4 gm of $Tb_4O_7$, 5.6 gm of $Tm_2O_3$ and 2330 gm of $La_2O_3$ are dissolved in 11.6 liters of water and 3.02 liters of 70% $HNO_3$. After dilution to 18.3 liters, 3500 gm of oxalic acid dehydrate are added. The mixture is stirred ½ hour, filtered and washed. The oxalate precipitate is fired 2 hours in open containers at 1000° C.

Next 1440 gm of $NH_4Br$ are blended with 2230 gm of the above ignited oxalate (now $La_2O_3$ 0.002 $Tb_2$, 0.002 $Tm_2$) and then fired 2 hours at 400° C in covered trays.

After cooling, 3000 gms. of this mixture are blended with 531 gm of KBr and the resulting mixture is fired for 2½ hours in covered trays at 900° C.

After cooling, this mixture is washed in water to remove KBr and then finally filtered and dried. After sifting the phosphor is ready for use in x-ray screens.

Speed measurements were preformed on 4 mil thick screens prepared in a conventional fashion and a comparison was made to the standard DuPont Par phosphor material using Medical Blue Film Kodak BB-54. The results are shown in Table I below.

TABLE I

| Screen | Speed | Afterglow mv, Sec. | | | | | |
|---|---|---|---|---|---|---|---|
| | | 0 | 1 | 10 | 20 | 30 | 60 |
| DuPont Par | 1.0 | 70+ | 10 | 3 | 2 | 0 | 0 |
| LaOBr .002 Tb, .002 Tm | 4.3 | 100+ | 100 | 11 | 5 | 2 | 0 |

The Tb, Tm-activated phosphor of the present invention demonstrates an afterglow which is high for the first 10 seconds but which rapidly decays. This is quite acceptable for normal use of x-ray screens. However, the greatly increased speed as compared to the conventional phosphor material should be noted. An important advantage of the present LaOBr:Tb, Tm was noticed when emission spectra were obtained under cathode ray excitation. Tests were made between the present phosphor material and LaOBr:Tb and LaOBr:Tm. The results of a comparison are shown in Table II.

TABLE II

| Phosphor Composition | Emission | |
|---|---|---|
| | % Below 400 nm (near UV) | % Above 400 nm |
| LaOBr .002 Tb | 36 | 64 |
| LaOBr .002 Tm, .002 Tb | 62 | 38 |
| LaOBr .002 Tm | 69 | 31 |

The near UV emission of LaOBr 0.002 Tm 0.002 Tb is similar to LaOBr 0.002 Tm but the speed is about 10% faster. This would cause the reduction of the crossover phenomenon experienced in x-ray screens utilizing other phosphor materials. This also leads to improved image quality of radiograms prepared by use of these phosphors in x-ray screens.

A comprehensive comparison was made of several samples of the phosphor LaOBr:Tb, Tm. The results are summarized in Table III.

TABLE III

| Sample | Tb Mol | Tm Mol | % Emission Below 400 nm (near UV) | Relative Speed | Afterglow, mv-sec | | | | | |
|---|---|---|---|---|---|---|---|---|---|---|
| | | | | | 1 | 5 | 10 | 30 | 60 | 120 |
| 1 | .002 | 0 | 36% | 5.4 | 18 | 10 | 8 | 5.5 | 4.5 | 3.8 |
| 2 | 0 | .0035 | 69 | 4.0 | >60 | 60 | 25 | 4.5 | 2.0 | 1.0 |
| 3 | .002 | .002 | 62 | 4.3 | >60 | 60 | 28 | 6.5 | 4.0 | 1.5 |
| 4 | .002 | .0005 | 57 | 4.7 | 30 | 12 | 7 | 3 | 2.0 | 1.5 |
| 5 | .002 | .0001 | 45 | 4.7 | 30 | 13 | 8 | 5 | 4.0 | 3.0 |
| 6 | .004 | .001 | — | 4.2 | >30 | 12 | 7 | 4 | 2.5 | 1.5 |

Table III summarizes the experimental results for speed, afterglow and % emission below 400 nm (ultraviolet region). All speeds were compared to DuPont Par with speed set equal to 1.0 using Kodak BB-54 blue film at 80 KV PEAK 1 inches Al filtration. Emissions were obtained on a Cary 14 Spectrophotometer using a demountable CR apparatus at 10KV. Afterglow readings were obtained on a storable image oscilloscope after excitation for 10 sec. by 90 KV peak and 0.5 ma. x-rays and are compared to commercial LaOBr 0.002 Tb and LaOBr 0.0035 Tm phosphors. In all cases, screens were constructed with phosphor layer thickness at 4.0 mil and at 60 vol. % phosphor loadings.

As will be appreciated from a review of Table III, several unexpected results occur from a LaOBr:Tb, Tm coactivated system. Briefly stated, the coactivated system exhibits:

1. Tb like afterglow characteristics for the first 10 seconds. The initial low values are accompanied by rapid decay of afterglow thereafter.
2. After 10 seconds the afterglow follows a Tm like decay which is more rapid than for Tb along.
3. The emission characteristics predominate in the near UV which is desirable for the reduction of unwanted crossover.
4. The screen speeds are intermediate between all Tm and all Tb at low Tm concentrations.

Another great advantage for the present coactivated system is the significant reduction in thulium content that is necessary in an image converter. This substantially reduces the cost of a thulium-activated phosphor.

For example, the thulium content may be reduced from about 0.003 moles to possibly 0.0005 moles.

The utilization of the coactivated system renders synergistic results. The expected behavior of two activators in a single host is one competing for the exciting energy and otherwise acting independently. Often there is a tendency to quench the various emissions, thus reducing overall efficiency. In the Tb-Tm coactivated case, the life times of the various excited states of Tm and Tb appear to facilitate efficient energy transfer toward the Tm centers such that the final product is more efficient at lower Tm concentrations. At the same time, the activator interactions appear to significantly change the afterglow decay mechanisms such that the initial decays follow Tb and the longer decays follow the Tm modes. Both are desirable features in x-ray screen applications. The synergistic argument is enhanced by emphasizing that a simple mechanical mixture of LaOBr:Tm and LaOBr:Tb do not give the advantageous results mentioned above. For instance, mixtures of 50% LaOBr 0.002 Tm and 50% LaOBr 0.002 Tb give, for afterglow at 5 seconds, 25 mv and at 120 seconds, 2.5 mv instead of the values found for Sample 4 of Table III which has about 50% Tb and 50% Tm emissions respectively, again indicating a synergistic effect of coactivated Tb-Tm in LaOBr:Tb, Tm phosphors.

The FIGURE shows an arrangement consisting of a double emulsion photographic film 9 which has a polyester base 10 incorporating a dye system which absorbs ultraviolet light which ordinarily crosses over from one of the silver halide emulsion layers to the other, 11a to 11b and vice versa. Light crossover will cause the widening of images and blurring due to the lack of alignment or registry between the image as formed on the principle emulsion layer and the emulsion layer which receives the crossover image. This is illustrated by crossover light rays passing from emulsion layer 11a to 11b. As will be appreciated, there is an enlarged image on the emulsion layer 11b which will be read as a blurring effect after the film is processed. In order to minimize the effect of crossover, it is desirable to have the phosphor emit, primarily, in the UV region rather than the visible light region. This is due to the fact that the UV emission from a phosphor adjacent the emulsion layer undergoes absorption by the silver halide particles of the emulsion layer. Additional UV radiation is absorbed by the polyester base 10. If a UV absorbing dye were incorporated in the polyester base 10, then even a greater portion of crossover UV light would be absorbed prior to passing to the distant emulsion layer. If a particular phosphor has a high visible light emission, it is difficult to reduce the crossover of this visible light, between emulsion layers, because any absorption materials would also absorb the visible light necessary to read the film after processing. The present coactivator phosphor system has the advantageous characteristic of a high UV emission characteristic which is closer to the more desirable thulium-activated phosphor than the terbium-activated phosphor. A UV dye which will demonstrate the UV absorption characteristic is well known and is commercially available. It is an organic dye identified as Cyasorb (2-hydroxy-4-methoxy-benzophenone) and is available from American Cyanamid Company but it is expected that 1, 3, 5-triazine could be substituted.

An x-ray intensifying screen portion shown in the FIGURE is constructed of a flexible backing 5, a reflector layer 6, a coactivated phosphor layer 7, to which this invention relates, and a transparent layer 8. It is to be appreciated that in the image converter illustrated in the FIGURE, there are two intensifying screens symmetrically positioned about the photographic film.

Although the coactivator system of the present invention is explained in connection with an x-ray intensifier screen, it should be mentioned that the phosphors of the present invention may be used as x-ray image converters generally, including fluoroscopic screens and x-ray image intensifier tubes as well as the x-ray intensifier screens discussed.

It will also be apparent from the foregoing description that novel phosphor compositions have been disclosed for x-ray image converter devices having particular advantages when employed in radiographic screens. It should also be appreciated from the foregoing description that luminescent materials of the present invention can be prepared having slightly modified compositions than above specifically disclosed without sacrificing the disclosed performance advantages. For example, a minor substitution of fluoride ion for chloride or bromide ion in the phosphor host material should not materially lower these advantages. It is intended to limit the present invention, therefore, only by the scope of the following claims.

What I claim as new and desire to secure by Letters Patent of the United States is:

1. A rare earth oxyhalide phosphor according to the formula $Ln_{1-y-w}OX:Tb_yTm_w$
    wherein $Ln$ is one or more of lanthanum and gadolinium;
    $x$ is one or more of chlorine and bromine;
    $Tb$ and $Tm$ are present as coactivators;
    $y$ is from about 0.0005 to 0.010 moles per mole of the selected oxyhalide; and
    $w$ is from about 0.00005 to 0.005 moles per mole of the selected oxyhalide;
    the phosphor exhibiting relatively low afterglow and relatively high ultraviolet light emission.

2. An image converter including the phosphor of claim 1 supported on a base member, said phosphor being capable of converting x-radiation to radiation of longer wavelength.

3. An image converter as set forth in claim 2 adapted for intensifying the exposure of photographic film to x-radiation.

4. The subject matter set forth in claim 2 wherein said phosphor is lanthanum oxybromide coactivated with thulium and terbium.

5. An image converter as set forth in claim 2 wherein said phosphor is lanthanum oxychloride coactivated with thulium and terbium.

6. The subject matter set forth in claim 3 wherein the film includes a base for passing visible light and absorbing ultraviolet light, the film further having an ultraviolet light absorbing dye incorporated therein for cumulatively reducing ultraviolet light crossover occurring across the base.

7. The subject matter set forth in claim 6 wherein the base is coated with two oppositely disposed silver halide emulsions which are blue sensitive.

8. An image converter comprising:
    a polyester base passing visible light therethrough and having a silver halide emulsion layer coating a first surface of the base;
    a coactivated phosphor layer positioned in spaced registry from the emulsion layer, the phosphor being a rare earth oxyhalide according to the formula $Ln_{1-y-w}OX:Tb_yTm_w$
    wherein
    $Ln$ is one or more of lanthanum and gadolinium;
    $x$ is one or more of chlorine and bromine;
    $Tb$ and $Tm$ are present as coactivators;
    $y$ is from about 0.0005 to 0.010 moles per mole of the selected oxyhalide; and
    $w$ is from about 0.00005 to 0.005 moles per mole of the selected oxyhalide;
    the phosphor exhibiting relatively low afterglow and relatively high ultraviolet light emission;
    a transparent layer abutted at opposite surfaces thereof by the emulsion layer and a first surface of the phosphor layer;
    a flexible backing positioned in spaced registry from the phosphor layer; and
    a reflector layer positioned in abutting relation, at opposite surfaces thereof by the flexible backing and the phosphor layer.

9. The image converter set forth in claim 8 together with additional and identical emulsion layer, phosphor layer, transparent layer, backing layer and reflector layer, symmetrically located with respect to a second surface of the base.

10. An image converter as set forth in claim 9 wherein the base incorporates an ultraviolet light absorbing dye therein for reducing ultraviolet light crossover occurring between the emulsion layers.

11. An image converter as set forth in claim 9 wherein said phosphor is lanthanum oxybromide coactivated with thulium and terbium.

12. An image converter as set forth in claim 9 wherein said phosphor is lanthanum oxychloride coactivated with thulium and terbium.

* * * * *